Sept. 15, 1970 D. H. WALE 3,528,670
MACHINE TOOL CHUCK
Filed May 6, 1968 6 Sheets-Sheet 1

INVENTOR
DENNIS HARRY WALE
BY *Ralph N. Kalish*
ATTORNEY

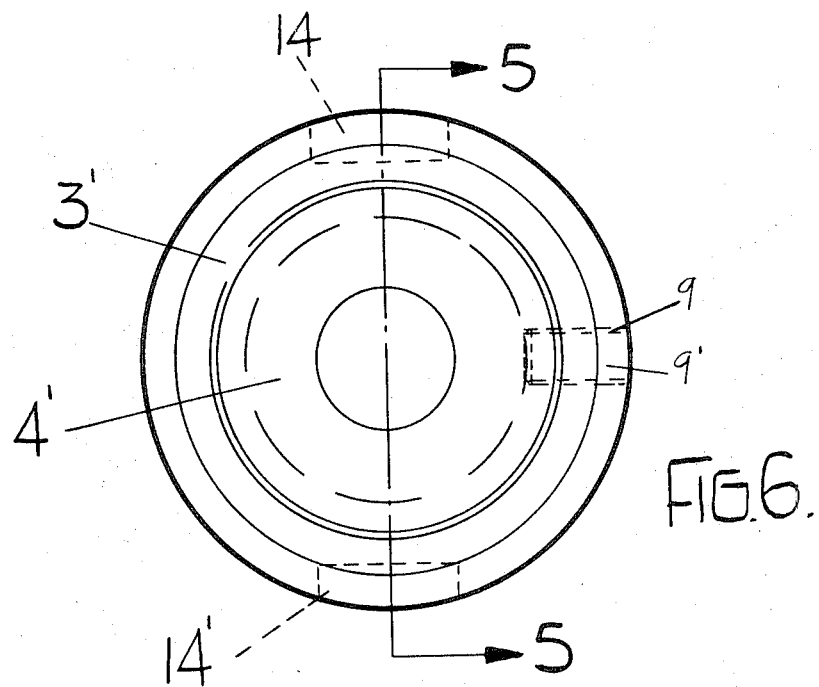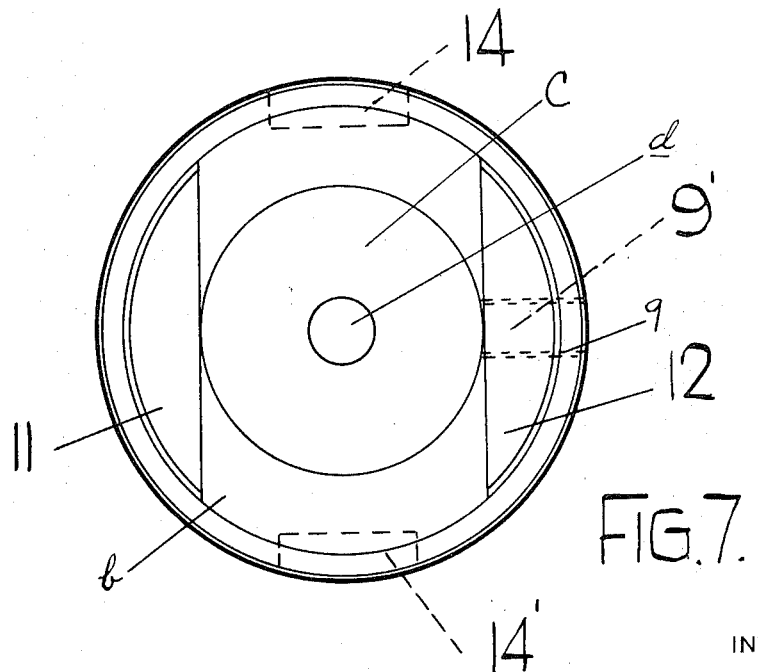

INVENTOR
DENNIS HARRY WALE

Sept. 15, 1970          D. H. WALE          3,528,670

MACHINE TOOL CHUCK

Filed May 6, 1968          6 Sheets-Sheet 5

INVENTOR

DENNIS HARRY WALE

BY Ralph N. Kalish

ATTORNEY

Sept. 15, 1970        D. H. WALE        3,528,670
MACHINE TOOL CHUCK
Filed May 6, 1968        6 Sheets-Sheet 6
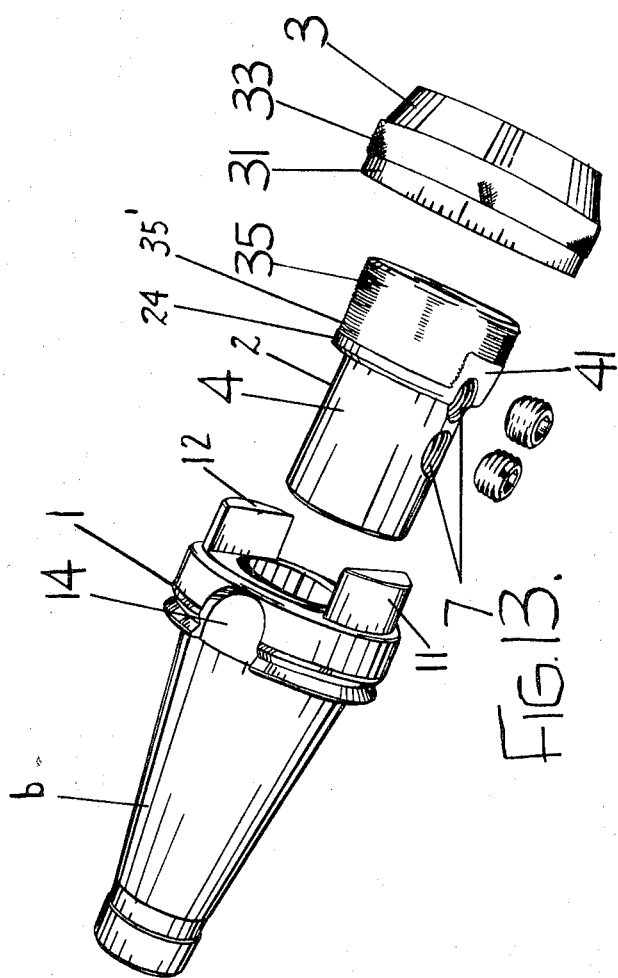
INVENTOR
DENNIS HARRY WALE
BY Ralph N. Kalish
ATTORNEY United States Patent Office 3,528,670
Patented Sept. 15, 1970

3,528,670
MACHINE TOOL CHUCK
Dennis Harry Wale, Woodhouse Eaves, England, assignor to Marwin Anstey Limited, Rothley, Leicestershire, England
Filed May 6, 1968, Ser. No. 726,678
Claims priority, application Great Britain, Dec. 9, 1967, 56,102/67
Int. Cl. B23b 31/36
U.S. Cl. 279—8                                    14 Claims

ABSTRACT OF THE DISCLOSURE

A machine tool chuck comprising a chuck body for engagement to the spindle of the machine tool, and a tool-engaging member mountable within said chuck body; there being means for easily adjusting said tool-engaging member in relative axial position within said chuck body for appropriate disposition of the related tool, and with components designated to achieve centering of the received tool.

BACKGROUND AND SUMMARY OF THE INVENTION

This invention relates in general to machine tools and, more particularly, to tool-engaging members or chucks. It is a primary object of the present invention to provide a tool-engaging member, such as a chuck sleeve or chuck arbor, for facile mounting within a spindle-engaged chuck body whereby such members may be of varying sizes for accommodating the shanks or bores of different sized tools. Generally, these sizes are standard, as are the shapes of the tool shanks or bores, which may, for example, be cylindrical with Weldon flats, Clarkson-ended, Clare-ended or tapered with a non-stick 30, 40, 50 or 60 International Standards Association taper or a stick paper of the Morse, Jarno or Brown and Sharp Variety.

It is another object of the present invention to provide a tool chuck having a chuck body and a tool-engaging member with means for effecting longitudinal adjustment of the latter within the former such as, for example, as may be requisite after regrinding or for setting as to length for numerical control.

Another object of the present invention is to provide a machine tool chuck of the character stated having a chuck body adapted for driven engagement with the machine tool spindle and with a readily replaceable tool-engaging member.

It is a still further object of the present invention to provide a machine tool chuck of the character stated incorporating a tool-engaging member with means for conducing to snug, centered reception of the particular tool and with means for taking up any undesired clearance between the chuck body and the tool-receiving member.

It is a still further object of the present invention to provide a machine tool chuck of the character stated which may be most economically manufactured; which may be easily utilized by machine shop personnel; and which is durable and reliable in usage.

BRIEF DESCRIPTION OF THE DRAWINGS

FIG. 6 is an end view of the chuck shown in FIGS. 4 and 5.

FIG. 7 is an end view corresponding to FIG. 6 but with the adjustment nut and chuck sleeve omitted.

FIG. 13 is an exploded perspective view of the machine tool chuck shown in FIGS. 4 to 7.

DESCRIPTION OF PRACTICAL EMBODIMENTS

Figure 1:
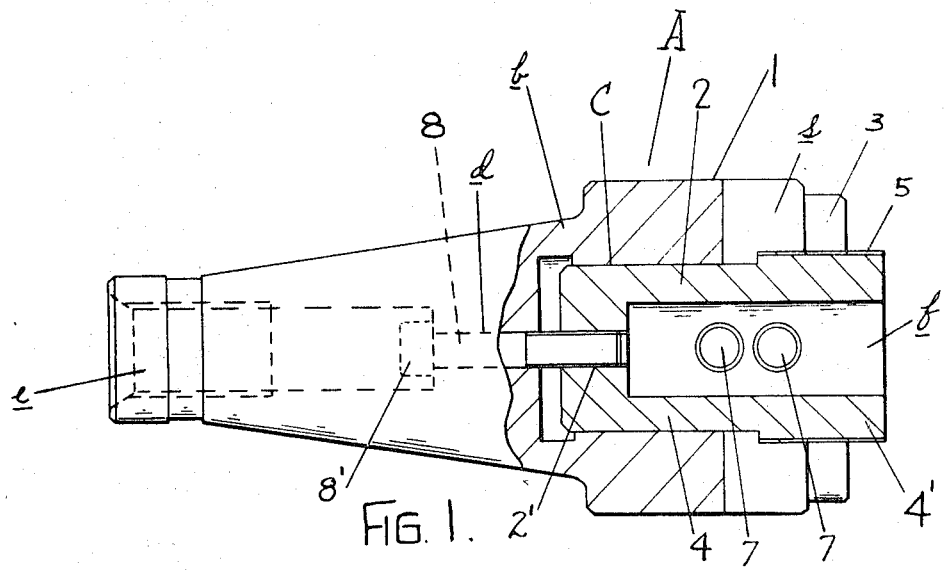
FIG. 1 is a side elevational view, in partial section, of a machine tool chuck constructed in accordance with and embodying the present invention.

Referring now to the drawings which illustrate practical embodiments of the present invention, A generally designates a chuck, or tool-holder, for use with machine tools, comprising a body $b$ having a relatively enlarged, generally cylindrical head portion 1 and a tail portion $c$ which may be of tapered form, as shown in FIG. 1, or, desirably, of constant cross section, so as to effect appropriate accommodation with the associated machine tool. Body $b$ is provided with an axial bore $d$ extending from end to end thereof, being counterbored in head portion 1 to form a relatively enlarged chamber C. In tail portion $c$, bore $d$ is also counterbored to present a diametrally increased slot $e$ for receiving the spindle (not shown) of the related machine tool. As will be shown hereinbelow, chucks of the present invention are equally adaptable for coupling with off-set drive means.

Figure 2:
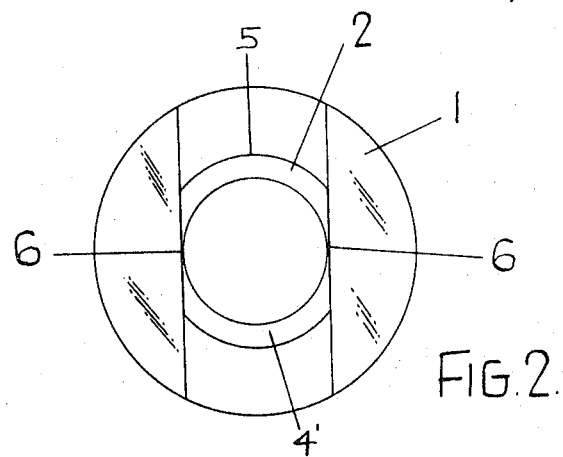
FIG. 2 is an end view of the tool-receiving end of the machine tool chuck.

Disposed within chamber C is a chuck sleeve 2 being of appropriate outside diameter for axially adjusted disposition within said chamber C. Chuck sleeve 2, being of cylindrical formation, having a body 4 and a head portion 4' of relatively greater diameter, is axially bored as at 2' for alignment with bore $d$ of chuck body $b$, and is counterbored to provide a socket-forming recess $f$ to accept the shank of the particular tool (not shown). As may best be seen in FIG. 2, head portion 4' is cut away on its opposite side faces to define planar segments or, more commonly called flats, 6, 6' for driven engagement with the confronting side faces $s$, $s'$, respectively, of a diametrally extending slot S formed in the proximate end of head portion 1 of chuck body $b$ (see FIGS. 2 and 3). Intermediate said drive flats 6, 6', head portion 4' of chuck sleeve 2 is externally threaded, as at 5, for engagement with the threads of an adjustment nut 3. Chuck 2 is of such length that it will normally project beyond the proximate end face of chuck body $b$ so that adjustment nut 3 will abut on its end edge thereagainst. In order to reliably retain a tool within socket $f$, chuck sleeve 2 is provided with, preferably, a pair of drilled and tapped openings 7, 7 extending through one side thereof to engage flats (not shown), as of the Weldon type, formed on the shank of the related tool. Bore 2' of chuck sleeve 2 is threaded for engaging the external threads of a cap screw 8, the head 8' of which is disposed in slot $e$. Screw 8 embodies a smooth shank portion which is received within bore $d$ of chuck body $b$ for slideability therein to allow for easy longitudinal adjustment. Head 8' is presented for abutting the end wall of slot $e$.

In usage, with the particular tool previously fixed in socket $f$, chuck sleeve 2 is inserted into chamber C and cap screw 8 is then manipulated through slot $e$ for engagement within sleeve threaded bore 2'. The precise relative position of the accepted tool with respect to chuck body *b* is attained by operation of adjustment nut 3 to cause axial movement of chuck sleeve 2 into appropriate position within chamber C; said nut 3 thus abutting the confronting end of chuck body *b*. Thereupon cap screw 8 is further manipulated to lock chuck sleeve 2 into such selected position. It will be observed that by providing threads 5 along only a portion of the length of head 4', proximate the tool-end of chuck A, it prevents adjustment through manipulation of adjustment nut 3 to a point where sleeve 2 would lose engagement with chuck body *b* and fall therefrom. Obviously, if desired, a stop could be provided on sleeve 2.

Referring now to FIGS. 4 to 10, inclusive, as well as FIG. 13, certain structural modifications of the components of the chuck A of the present invention are shown. However, for purposes of facilitating description thereof, parts thereof which correspond both structurally and functionally to parts of chuck A hereinabove described, will be accorded the same reference designations. As may best be seen in FIGS. 4, 5 and 13 chuck sleeve 2 is provided with a diametrically increased head 24 which, at its outer, tool-adjacent end, is externally threaded so as to provide a series of continuous threads, as at 35, and an interrupted threaded portion spacedly inwardly therefrom, as at 35', there being planar surfaces or drive flats 41, 42 formed in the outer face of said head 24 in diametrically opposed relationship. Said flats 41, 42 are thus located spacedly from the adjacent end face of chuck sleeve 2 and cause the interruption of the threads 35'. Provided for engaging said threads 35, 35' is an adjustment nut 3' which incorporates a skirt 31 directed toward the spindle end of chuck A and of such extent as to provide a guard for inhibiting the inadvertent entry of chips into chuck A during usage. A circumferential portion of skirt 31 is knurled, as at 33, to facilitate adjustment. It is preferable that threads 35, 35' be of left-handed character so that in operation adjustment nut 3' will tend to become tightened, as distinguished from loosened, against the adjacent end face of chuck sleeve 2 upon quick spindle braking. This particular feature obviates the necessity for any locking means as nut 3' is utilized merely for adjustment and not for drive purposes. Preferably, adjustment nut 3' is calibrated so that a given degree of rotation advances the particular tool engaged within chuck sleeve 2 a predetermined distance. Drilled and tapped within head portion 1 of chuck body *b* is a radially extending opening 9, said opening being in diametrally opposed relationship to openings 7, 7. Presented for engagement within opening 9 is a steady screw, indicated in phantom lines at 9', in FIGS. 6 and 7, for bearing against the side face of chuck sleeve 2 for taking up any clearance that might exist. Screws secured within openings 7, 7 cooperate with steady screw 9' for maintaining the received tool in maximum centered position, or, in other words, to reduce tool eccentricity.

Figure 3:
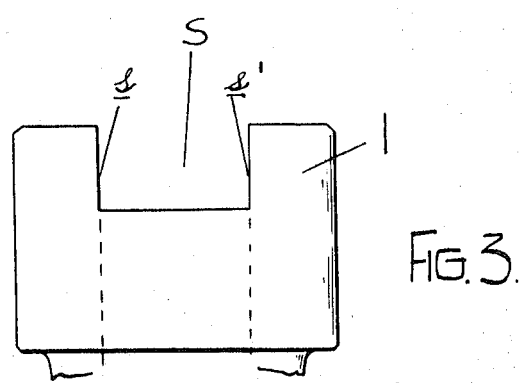
FIG. 3 is a fragmentary top plan view of the head portion of the chuck body.
Figure 4:
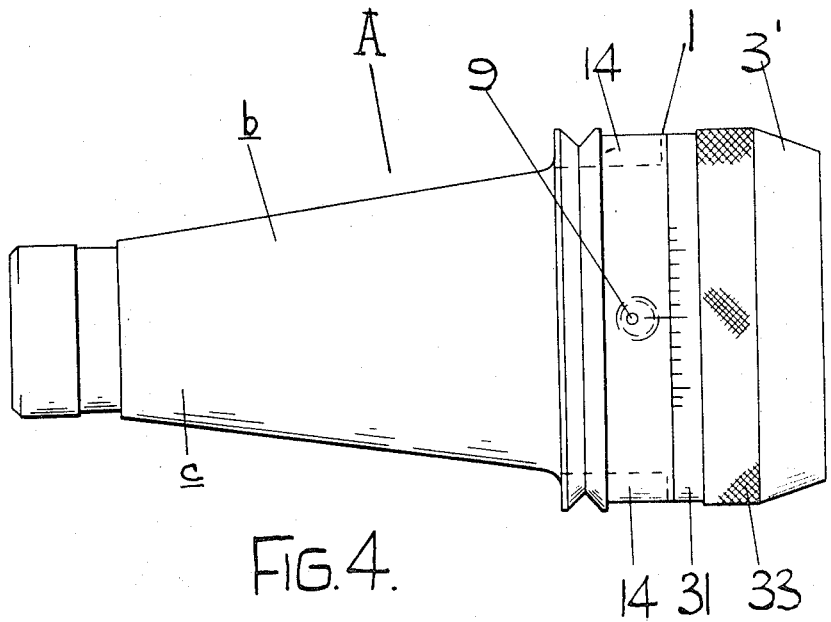
FIG. 4 is a side elevational view of another form of machine tool chuck constructed in accordance with and embodying the present invention.
Figure 5:
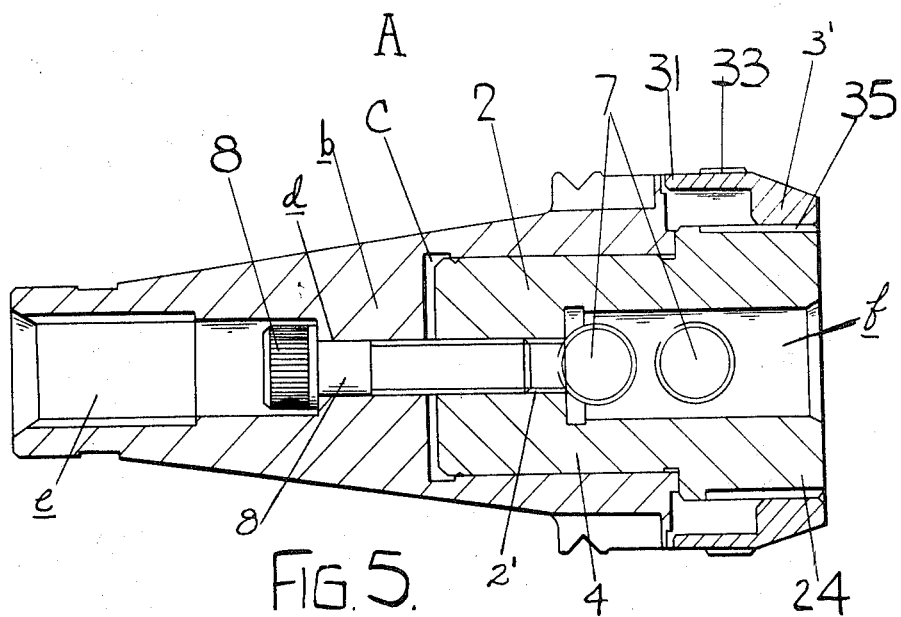
FIG. 5 is a vertical transverse sectional view taken on the line 5—5 of FIG. 6.
Figure 9:
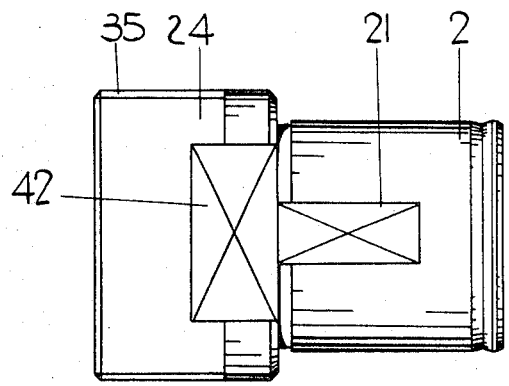
FIG. 9 is a side elevational view of the chuck sleeve shown in FIG. 8 but at an angle of 180 degrees thereto.
Figure 10:
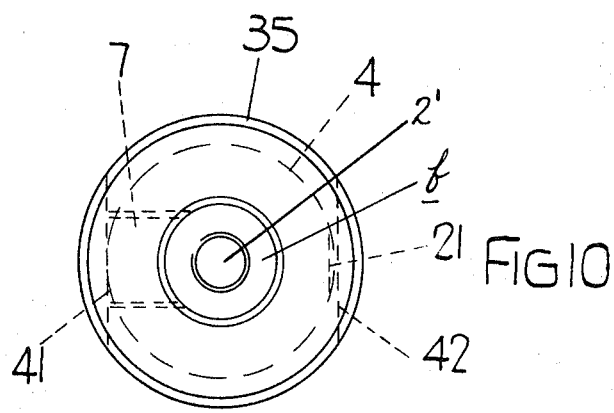
FIG. 10 is an end view of the tool-receiving end of the chuck sleeve shown in FIGS. 8 and 9.
Figure 8:
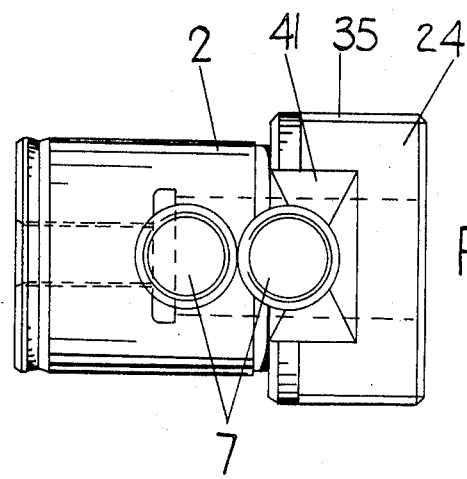
FIG. 8 is a side elevational view of the chuck sleeve shown in FIG. 5.

As may best be seen in FIG. 13, the head portion 1 of chuck body *b* may be provided with drive dogs 11, 12, being a variation upon the slotted end formation shown in FIG. 3, for driving engagement with drive flats 41, 42 of chuck sleeve 2. It has proved desirable that the said drive dogs 11, 12 be of different marginal width and with the drive flats 41, 42 being of corresponding difference in marginal depth so that sleeve 2 is capable of engagement within chuck body *b* in only a single position. Thus, for instance, drive dog 11 may be marginally wider than drive dog 12, and with related drive flat 41 being marginally deeper than drive flat 42 whereby chuck sleeve 2 could be mounted within chuck body *b* in but a single orientation. By such means it is, therefore, impossible to mount chuck sleeve 2 within chuck body *b* at an angle of 180 degrees from the proper, intended position. Thus, by insertion in only a single orientation, a doubling of the eccentricity is avoided. It may be observed that by the spacing of drive flats 41, 42 from the adjacent end of chuck sleeve 2 there is a denial of any gap through which chips might enter chuck A during operation.

Chuck sleeve 2 may be provided with a machined flat surface upon its side face, as at 21, for contact by the inner end of steady screw 9'.

As indicated in FIGS. 6, 7 and 13, head portion 1 of chuck body *b* may be provided with a pair of diametrically opposite drive slots 14, 14' for receiving drive from the spindle of the associated machine tool. Said drive slots 14 are located preferably at an angle of 90 degrees to opening 9 (FIGS. 6 and 7).

Figure 11:
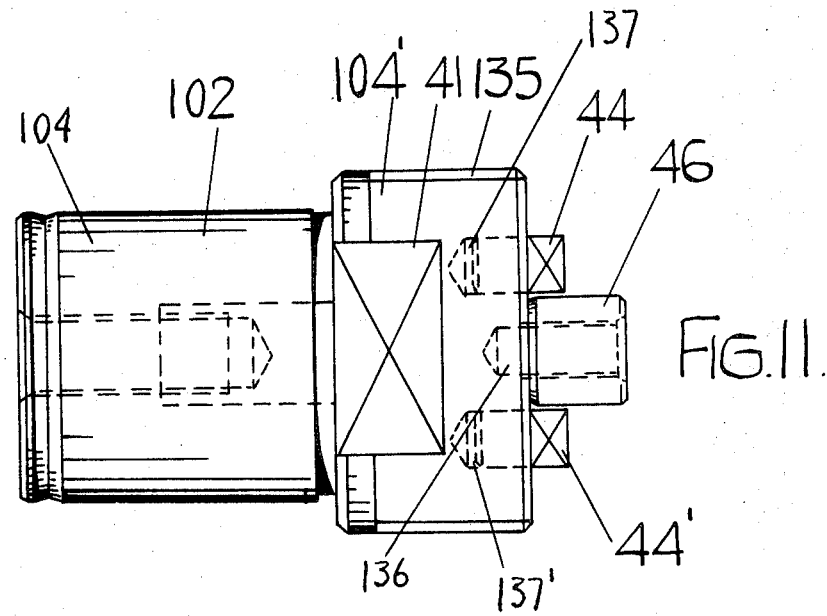
FIG. 11 is a side elevational view of another form of chuck sleeve constructed in accordance with and embodying the present invention.
Figure 12:
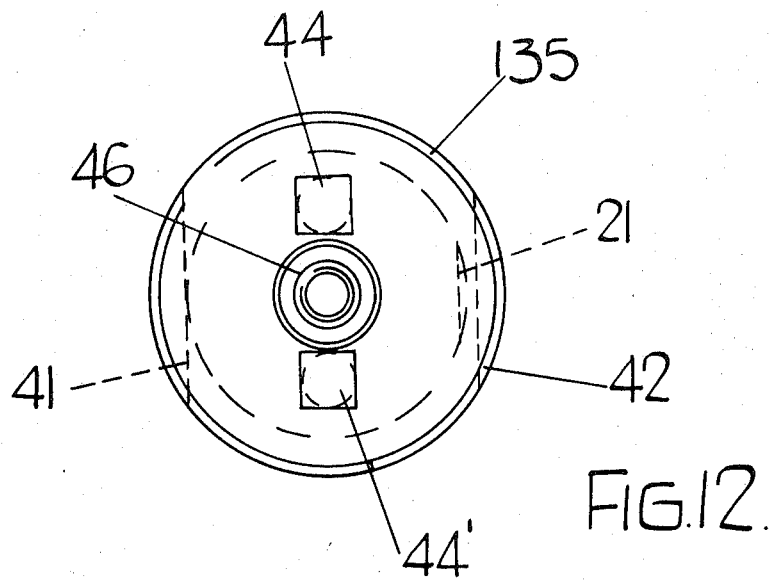
FIG. 12 is an end view of the chuck sleeve shown in FIG. 11.

Turning now to FIGS. 11 and 12, there is shown another form of chuck arbor at 102 having a body 104 and a diametrally enlarged head portion 104' which latter is externally threaded, as at 135, for engaging an adjustment screw (not shown). Head portion 104' is provided with diametrally opposed planar surfaces or flats 41, 42 for driven engagement with drive dogs (not shown) on the associated chuck body (not shown). Said arbor 102 is functionally related to chuck sleeve 2 hereinabove described but is designed for engaging the bore of the related tool. Thus, on its end face confronting the particular tool, head portion 104' is provided with a central socket 136 and a pair of lateral sockets 137, 137' on opposite sides of said center socket 136. Mounted within said lateral sockets 137, 137' are the stems of drive pegs 44, 44'. Fixedly received within socket 136 is the mounting stem of an enlarged male member 46 for engagement within the bore of the associated tool.

It should be understood that changes and modifications in the formation, construction, and arrangement and combination of the several parts of the machine tool chuck may be made and substituted for these herein shown and described without departing from the nature and principle of my invention.

Having thus described my invention, what I claim and desire to obtain by Letters Patent is:

1. A chuck for mounting the tool on the spindle of a machine comprising a body having a chamber opening through one end thereof, means provided on said body at the end thereof, remote from said chamber for mounting said body upon said machine, a tool-engaging member received within said chamber and having a head portion of greater cross section than said chamber for disposition outwardly thereof, means for restraining said tool-engaging member against relative rotative movement within said chuck chamber, adjustment means provided on said head portion for positionally adjusting said tool-engaging member relatively longitudinally of said chuck chamber, and means for maintaining said tool-engaging member in adjusted position.

2. A chuck as defined in claim 1 and further characterized by said tool-engaging member having a body portion dimensioned for reception within said chuck chamber, said body portion having a relatively less cross section than said head portion, said body portion and said head portion each being of fixed cross sectional extent.

3. A chuck as defined in claim 2 and further characterized by said tool-engaging member having a socket opening through its chuck-remote end, said socket extending through said head portion and terminating within said body portion.

4. A chuck as defined in claim 2 and further characterized by said means for restraining said tool-engaging member against relative rotative movement comprising cooperating inter-engaging elements provided on said chuck and on said head portion of said tool-engaging member.

5. A chuck as defined in claim 4 and further characterized by one of said cooperating inter-engaging elements being located upon the head portion of said tool-engaging member.

6. A chuck as defined in claim 2 and further characterized by said cooperating inter-engaging elements comprising at least one dog provided on said chuck body and said tool-engaging member having a flat for surface-wise engaging said dog.

7. A chuck as defined in claim 2 and further characterized by said cooperating inter-engaging elements comprising a pair of dogs provided on said chuck in spaced apart relationship, said head portion having a pair of flats positioned for alignment with said dogs for surfacewise engaging same.

8. A chuck as defined in claim 7 and further characterized by one of said dogs having a relatively greater marginal width, one of said tool-engaging member flats having a greater marginal depth for cooperation with the aforesaid dog thereby assuring a fixed relationship between said chuck and said tool-engaging member.

9. A chuck as defined in claim 1 and further characterized by said adjustment means comprising an internally threaded nut having calibrations, said head portion being externally threaded, said nut being engaged upon said head portion, said nut further having an inner-end surface confronting the end face of said chamber-bearing end of said chuck.

10. A chuck as defined in claim 1 and further characterized by said means for maintaining said tool-engaging member in adjusted position comprising a cap screw, said tool-engaging member having an axial bore, said chuck having a bore continuous with said chamber and axially aligned with said tool-engaging member axial bore, said cap screw extending into said aligned bore of said chuck and axial bore of said tool-engaging member and means inter-engaging said cap screw and tool-engaging member.

11. A chuck as defined in claim 10 and further characterized by said bore and said axial bore being aligned with the axis of the machine spindle, and said means inter-engaging said cap screw and said tool-engaging member comprising external threads on said cap screw and internal threads provided within the axial bore of said tool-engaging member.

12. A chuck as defined in claim 2 and further characterized by said chuck having a threaded opening axially normal to said chamber and in communication therewith, a set screw engaged within said opening for bearing at its inner end against said tool-engaging member to maintain same in axially aligned relationship with said spindle for reducing eccentricity.

13. A chuck as defined in claim 1 and further characterized by being adapted to mount a tool having a plurality of sockets therein, there being a plurality of male drive members mounted on said tool-engaging member and extending from the end thereof remote from said chuck and being engaged within said tool sockets for retaining said tool in operative position.

14. A chuck as defined in claim 1 and further characterized by being adapted to mount a tool having a plurality of sockets, there being a relatively enlarged male member projecting axially from the end of said tool-engaging member remote from said chuck, and a pair of drive pegs provided on said tool-engaging member in diametrically aligned, but on opposite sides of said male member, said male member and said drive pegs being received within sockets of said tool for maintenance of the latter in operative position.

References Cited
UNITED STATES PATENTS

| | | | |
|---|---|---|---|
| 2,709,600 | 5/1955 | Lehde | 279—83 XR |
| 2,857,166 | 10/1958 | Conn | 279—83 |
| 3,444,781 | 5/1969 | Sunderman | 279—9 XR |

ROBERT C. RIORDON, Primary Examiner

D. D. EVENSON, Assistant Examiner

U.S. Cl. X.R.
279—93